United States Patent [19]
Cole

[11] 3,874,783
[45] Apr. 1, 1975

[54] NUMERICAL APERTURE EXPANSION IN FIBER OPTIC DEVICES

[75] Inventor: Henry B. Cole, Woodstock, Conn.

[73] Assignee: American Optical Corporation, Southbridge, Mass.

[22] Filed: Mar. 8, 1974

[21] Appl. No.: 449,320

Related U.S. Application Data

[63] Continuation of Ser. No. 277,702, Aug. 2, 1972, abandoned.

[52] U.S. Cl. ............................................. 350/96 B
[51] Int. Cl. ............................................. G02b 5/16
[58] Field of Search .................... 350/96 B, 96 C

[56] References Cited
UNITED STATES PATENTS

| | | | |
|---|---|---|---|
| 3,043,910 | 7/1962 | Hicks | 350/96 B X |
| 3,142,235 | 7/1964 | Siegmund | 350/96 B X |
| 3,389,950 | 6/1968 | Harper | 350/96 B X |
| 3,402,000 | 9/1968 | Crawford | 350/96 B |
| 3,661,065 | 5/1972 | Yamazaki et al. | 350/96 B X |

*Primary Examiner*—David H. Rubin
*Attorney, Agent, or Firm*—H. R. Berkenstock, Jr.; William C. Nealon

[57] ABSTRACT

A fiber optic device comprised of a pair of bundles of light-conducting optical fibers each having light-receiving and light-emitting opposite end faces. A light-emitting face of one bundle and a light-receiving face of the other bundle are coupled together unsymmetrically with respect to axes of correspondingly interfacially related fibers of the two bundles wherewith light entering the uncoupled light-receiving face of the one bundle at a given numerical aperture will be emitted from the uncoupled light-emitting face of the other bundle at an angular spread of larger numerical aperture than that of the entering light.

5 Claims, 9 Drawing Figures

NUMERICAL APERTURE EXPANSION IN FIBER OPTIC DEVICES

This is a continuation of application Ser. No. 277,702 filed Aug. 2, 1972, now abandoned.

BACKGROUND OF THE INVENTION

1. Field of the Invention

Fiber optics with particular reference to the expansion of numerical aperture in fiber optical devices.

2. Description of the Prior Art

Fiber optic light and image-conducting devices commonly have relatively small output numerical apertures particularly when used as magnifiers and even more so when magnification is large, i.e., when the extent of taper of the magnifying device is large.

Light traversing tapered optical fibers inherently continually reduces in numerical aperture as it traverses the fibers from their small ends toward their larger ends. Thus, in fiber optic magnifiers, the viewing angle of output becomes progressively restricted in size as the degree of magnification is increased. Furthermore, with the viewing angle centered on the axis of a fiber optic device as in the usual case, output of the device is awkwardly directed for some applications of use. Viewing from above or directly in front of an image-emitting device is often considerably less convenient than off-axis viewing.

Numerical aperture expansion in other than tapered fiber optic light and image-conducting devices, making wide angle and/or off-axis viewing possible, is highly advantageous. In fiberscopes or in the control of beam spreading with fiber optics in laser or conventional light-projecting lens systems for example, the capability of controlling light spreading and viewing angle direction has considerable utility. The present invention makes this possible.

SUMMARY OF THE INVENTION

Controlled numerical aperture expansion and orientation of viewing angle in fiber optical light and image transmitting devices is accomplished according to this invention by off-axis coupling of fiber optic bundles wherewith the introduction of light from one bundle into another unsymmetrically with respect to the axis of the other bundle results in a distribution or spreading of light through controlled, greater than the usual emitting aperture. Unsymmetrical off-axis coupling is accomplished by forming one or more of the coupled faces of the fiber optic devices oblique to the axes of fibers of at least one of the fiber bundles.

Details of the present invention will become apparent in the following description when taken in conjunction with the accompanying drawings.

IN THE DRAWINGS

DESCRIPTION OF THE PREFERRED EMBODIMENTS

Figure 1:
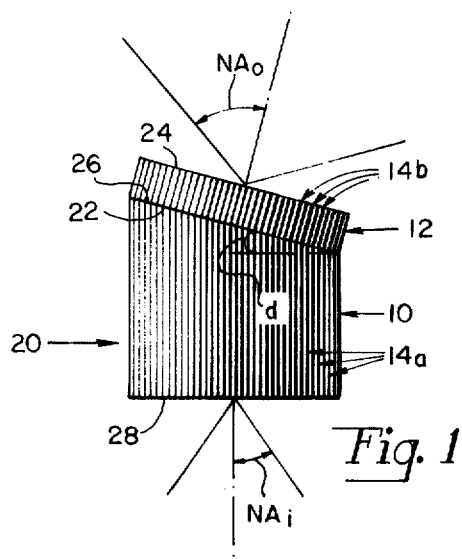
FIG. 1 is a diagrammatic illustration of off-axis coupling of fiber optical bundles according to one aspect of the present invention.
Figure 2:
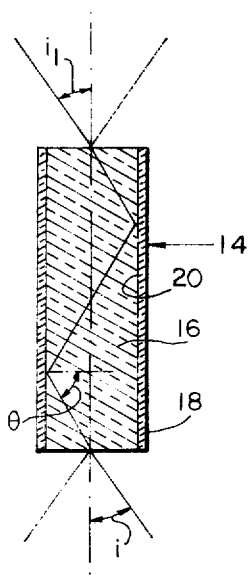
FIG. 2 is a longitudinal cross-sectional view of an optical fiber wherein the behavior of light conducted therethrough is diagrammatically illustrated.

FIG. 1 illustrates an interfacially coupled pair of fiber optic light-conducting components 10 and 12 wherewith numerical aperture expansion is accomplished according to one aspect of the invention. Components 10 and 12 each comprise a large number of light-conducting fibers all bundled tightly together with their corresponding opposite ends forming light-receiving and light-emitting opposite faces of each component. Fiber 14 of FIG. 2 illustrates, in greatly enlarged scale, the type of construction making up each of fibers 14a and 14b of components 10 and 12. In this connection, fiber 14 has a core 16 of a relatively high refractive index glass, plastic, quartz or other light-conducting core material. The core 16 is surrounded by a relatively thin cladding 18 of lower refractive index material which is intimately interfacially bonded to core 16. Light entering one end of fiber 14 within the critical angle of reflection of interface 20 between core 16 and cladding 18 will transfer through fiber 14 according to the well known principles of total internal reflection. Those interested in greater details of construction and basic principles of operation of clad optical fibers per se may refer to any one of U.S. Pat. Nos. 2,825,260; 2,992,516; or 3,037,241.

With particular regard to matters of angular aperture or numerical aperture in optical fibers, it should be understood that the extreme meridianal ray which will be trapped in a fiber such as fiber 14 is found from:

$$n_g \sin \beta = n_c \sin 90° = n_c$$

or $$\sin \theta = \frac{n_c}{n_g}$$

where $n_g$ is the refractive index of the core of the fiber and $n_c$ is the refractive index of the fiber cladding.

To find the angle $i$ (FIG. 2) of this extreme meridinal ray outside the fiber $$\sin i = n_g \sin r = n_g \sin (90-\beta)$$

or $$\sin i = \sqrt{n_g^2 - n_c^2}$$

This is conventionally defined as the "numerical aperture" or NA of the fiber or any bundle of such fibers, e.g., component 10 or 12. For different applications, fibers having different combinations of refractive index may be used. For example, a relatively large NA can be accomplished with fiber 14 having an index of refraction $n_o$ for core 16 of 1.75 and an index of refraction $n_c$ of 1.52 for cladding 18. This would give an NA of 0.86 wherein the steepest acceptance angle $i$ would be approximately 59.4°.

It is further pointed out relative to exemplary fiber 14 (FIG. 2) that the half angle $i$ of a cone of light entering one end of the fiber will be substantially duplicated at the exit end of the fiber (e.g., as angle $i_1$) when fiber 14 is of uniform cross-sectional size throughout its length. The sines of angles $i$ and $i_1$ being the entrance and exit numerical apertures respectively will be referred to hereinafter as the NA in all remaining figures of the drawings. $NA_i$ will indicate the acceptance numerical aperture for light entering a particular fiber or bundle of fibers (light in) and $NA_o$ will indicate the emitting aperture or half spread of light emitted from a particular fiber or bundle thereof (light out).

Figure 3:
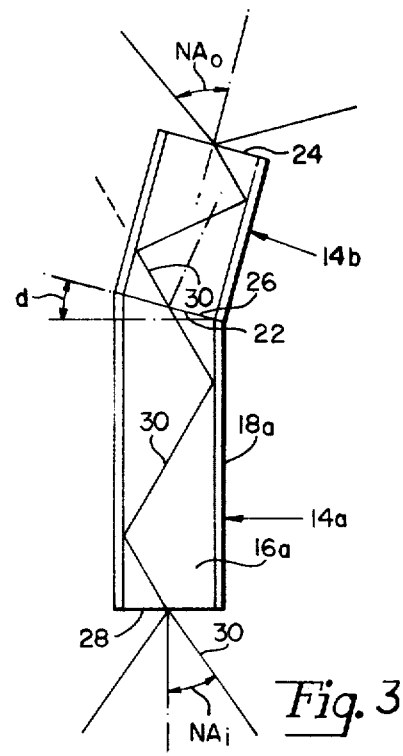
FIG. 3 is a greatly enlarged diagrammatic cross-sectional view of a pair of interfacially coupled optical fibers which schematically illustrate principles of operation of the FIG. 1 embodiment of the invention, all cross-sectioning has been omitted for ease and clarity of illustration.

Referring more particularly to the embodiment of the inventioin illustrated in FIGS. 1 and 3, it can be seen that the entrance numerical aperture $NA_i$ of the unit 20 is expanded in size to $NA_o$ at the uppermost exit end of the unit. This is accomplished by off-axis or unsymmetrical coupling of fibers 14a and 14b of components 10 and 12. In this particular case, component 10 having light-receiving and light-emitting faces 22 and 24 which are parallel to each other and perpendicular to the axes of fibers 14b is placed with face 22 coupled to light-emitting face 26 of component 10. Light-emitting face 26 of component 10 is biased relative to the axes of fiber 14a at a precontrolled angle (e.g., 10° to 15°) as shown more clearly in FIG. 3. While FIG. 3 illustrates the function of only one pair of coupled single fibers 14a and 14b of unit 20, it should be understood that all correspondingly bundled together and interfacially coupled fibers of unit 20 function in the same manner. Accordingly, like reference numerals in FIGS. 1 and 3 designate like parts.

It should be further understood that the change in NA at the coupling interface is dependent only on the angle between the two fiber axes, not on their positional alignment. Thus, although FIGS. 3, 4, 5 and 9 show perfect alignment between input and output fibers for ease of illustration, this positional alignment is not necessary. In most bundles such as 10 and 12, 32 and 34, 52 and 60, the alignment will be random with each fiber emitting light into or receiving light from more than one fiber of the coupled bundle.

Opposite to the coupling of face 22 of component 12 and biased face 26 of component 10, light-receiving face 28 is disposed perpendicularly to its axis. Light-entering face 28 of component 10, which face is a composite of all exposed ends of corresponding fibers 14a, is restricted in its numerical aperture to within an angular spread $NA_i$. This $NA_i$ may be established by the refractive index differential of cores 16a and claddings 18a of fibers 14a as was explained hereinabove with respect to fiber 14 of FIG. 2, or it may be limited to a lower value by other optical components. In traversing unit 20, however, the angular spread $NA_i$ of this light is expanded to an increased output numerical aperture $NA_o$ (FIG. 3). This numerical aperture expansion is diagrammatically illustrated in FIG. 3 by a tracing of ray 30 entering fiber 14a at $NA_i$. Upon entering fiber 14a, ray 30 is refracted by the external air-to-core 16a refractive index differential and then conducted by total internal reflection through fiber 14a as illustrated and explained hereinabove in connection with FIG. 2.

With faces 22 and 26 of fibers 14a and 14b optically interfacially coupled, ray 30 emerges directly into fiber 14b for continued conduction therethrough by total internal reflection. In fiber 14b, however, ray 30 becomes incident upon and reflected from the interface between the core and cladding of fiber 14b at a steeper angle than in fiber 14a and, consequently, with greater spread or $NA_o$ upon emission from fiber 14b. The change from the less critical angle of incidence along the interface of fiber 14a to the steeper angle of incidence along the interface of fiber 14b is produced by the off-axis relationship of the two fibers 14a and 14b resulting from coupling to the bias of face 26 of component 10.

It should be understood that by increasing or decreasing the angle of bias on face 26 of component 10, greater or lesser expansion of $NA_o$ can also be accomplished. The extent of angle of bias of face 26 further determines the viewing angle orientation of light emitted upwardly from unit 20. This off-axis viewing is selectively angularly adjustable by control of the angle of bias of face 26.

It can be seen that factors controlling numerical aperture $NA_o$ expansion and viewing angle orientation of fiber optic units such as unit 20 are relative values of refractive indices of cores and claddings of fibers 14a and 14b and the degree of bias of face 26 relative to the axis of component 10.

Figure 4:
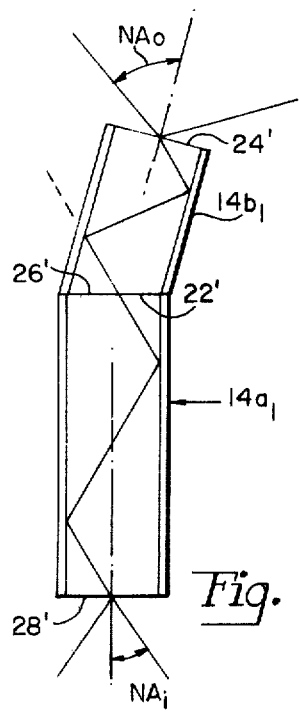
FIGS. 4 and 5 are diagrammatic cross-sectional views of interfacially coupled optical fibers illustrating modifications of the FIG. 1 embodiment of the invention also with all cross-section lines omitted.

While the unsymmetrical or off-axis coupling of faces 22 and 26 of unit 20 may be accomplished by biasing of face 26 only as just described, it should be understood that face 22 of component 13 may be biased instead. In FIG. 4, fiber 14a₁ has opposite end faces 26' and 28' which are perpendicularly parallel to the fiber axis. Fiber 14b₁ has face 22 disposed on a bias and opposite emitting face 24' disposed perpendicularly to its axis.

Figure 5:
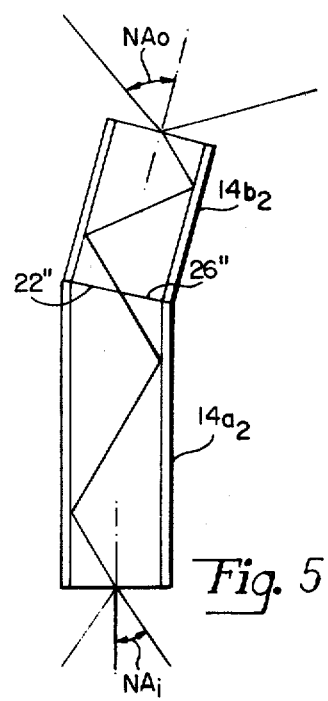

A still further modification of unit 20 is illustrated in FIG. 5. Numerical aperture expansion in FIG. 5 is accomplished with fibers 14a₂ and 14b₂ by substantially equally biasing the coupled faces 22" and 26".

It is pointed out that, in all embodiments of the invention described hereinabove and those to be subsequently described, numerical aperture designations $NA_i$ and $NA_o$ indicate half-angle spreads of cones of light which are emitted from the illustrated fibers and fiber units.

Figure 6:
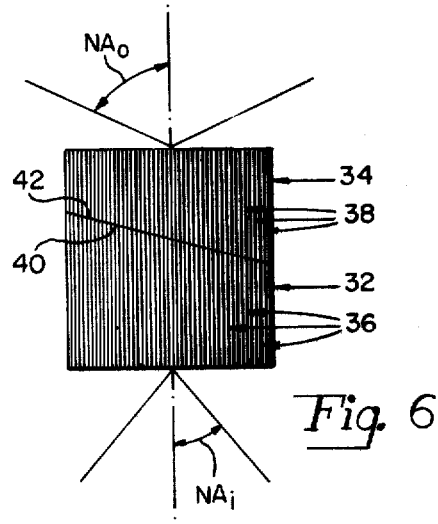
FIG. 6 is a side elevational view of another modified form of a coupled fiber optical element.
Figure 7:
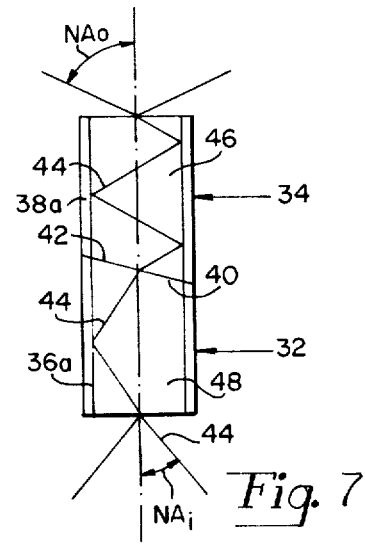
FIG. 7 is an enlarged diagrammatic cross-sectional view (without cross-section lines) of a pair of interfacially coupled optical fibers schematically illustrating the function and operation of the FIG. 6 embodiment of the invention.

Refractive index differentials between core glasses of interfacially coupled optical fibers and bundles thereof can be utilized to effect numerical aperture expansion, FIGS. 6 and 7 are presented to illustrate this aspect of the invention.

In FIG. 6 fiber optical components 32 and 34 each made up of tightly bundled together optical fibers 36 and 38 respectively are interfacially coupled without angulation. Matching biases of end faces 40 and 42 are used to retain axial direction symmetry of adjoining fibers 36 and 38. With this arrangement, numerical aperture expansion $NA_o$ is accomplished as follows:

Ray of light 44 (FIG. 7) which represents an extreme ray of the entrance cone whose half angle is $NA_i$, traverses fiber 36a by total internal reflection. Upon reaching face 40 of fiber 38a at interface 40-42, core material 46 of fiber 38a, being of lower refractive index than the core material 48 of fiber 36a, causes light ray 44 to refract still further away from the common axes of fibers 36a and 38a. In so doing, ray 44 becomes incident upon the fiber 38a interface at a steeper angle for continued conduction through fiber 38a and emission therefrom at the expanded numerical aperture $NA_o$. Thus, it can be seen that numerical expansion may be accomplished in straight coaxially aligned optical fibers and bundles thereof having biased coupling faces according to principles of the invention. While a flat interface 40-42 has been illustrated herein cylindrical, spherical or aspheric interfacial curvatures may be used to produce an effect upon the NA expansion which varies with the position of fibers 36, 38 in bundle 34.

Figure 8:
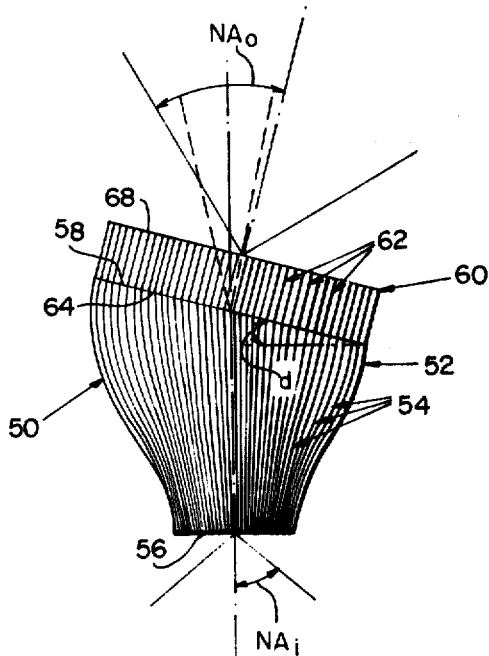
FIG. 8 is a side elevational view of still another modification of optical fiber components which are coupled together according to the present invention.

In tapered fiber optical bundles there is the peculiar problem of numerical aperture continually decreasing as light is transmitted from a small end to a larger end of the bundle. This, however, may be compensated for according to the present invention by expanding the emitting numerical aperture of such a unit as depicted in FIGS. 8 and 9.

Figure 9:
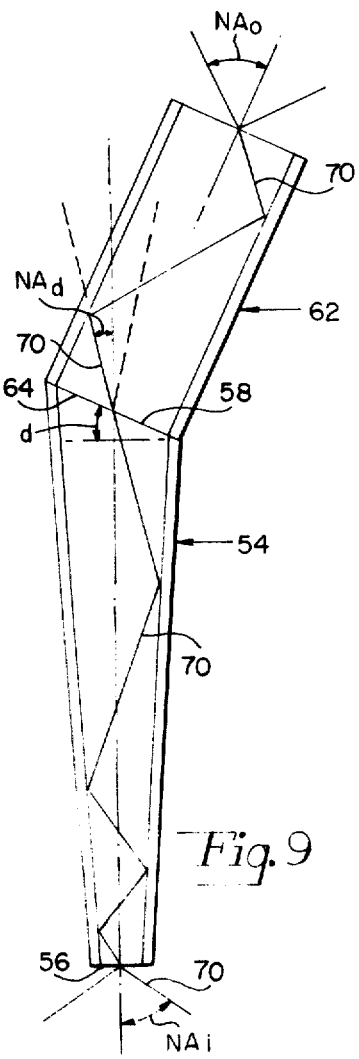
FIG. 9 is an enlarged diagrammatic cross-sectional view of a pair of interfacially coupled optical fibers schematically illustrating principles of operation of the FIG. 8 embodiment of the invention.

Fiber optic unit 50 comprises a major element 52 of tightly bundled tapered optical fibers 54 having their smaller ends grouped together as a light-receiving face 56 and their opposite larger ends grouped together as a light-emitting face 58. Face 58 is biased at angle α relative to the central axis of element 52. Light-receiving element 60 of unit 50 comprises a tight bundle of parallel cylindrical light-conducting fibers 62. Element 60 has oppositely disposed light-receiving and light-emitting faces 64 and 68 respectively which are each perpendicular to the axes of fibers 62. In unit 50, the numerical aperture $NA_i$ of light entering face 56 which inherently diminishes with the conduction of light through tapered element 52 is expanded to an extent partially, fully or overcompensating for the reduction in the output numerical aperture $NA_o$ of unit 50 with fiber optical element 60 as follows:

Referring more particularly to FIG. 9, the diminishing numerical aperture $NA_i$ of an extreme ray of light 70 entering tapered fiber 54 is illustrated. Angle $NA_d$ illustrates the diminished numerical aperture output of fiber 54 which is expanded by component 60 having fibers 62, one of which is illustrated in FIG. 9.

With ray 70 entering fiber 62 at angle $NA_d$ relative to the axis of fiber 54, the off-axis relationship of fiber 62 causes this ray to become incident upon its interface at a steeper angle of reflection thereby increasing its numerical aperture in fiber 62. This results in expansion of the output numerical aperture $NA_o$. It should be understood that with variation in the selection of core and cladding glasses for fibers 54 and 62 and/or differences in the angle α of interface 58-64, $NA_o$ may be expanded still further or reduced in degree, as desired.

I claim:

1. A fiber optic device having light-receiving and light-emitting oppositely disposed faces, one face having a different numerical aperture than the other, said device comprising:
a coupled together pair of bundles of tightly juxtapositioned light-conducting fibers, the fibers of each of said bundles individually comprising a core of high refractive index material and a cladding of material having a lower index of refraction than said core wherewith opposite end faces of said fibers are individually provided with a numerical aperture determined by the difference in refractive index between said core and cladding and said end faces in each of said bundles collectively providing the respective bundle faces with corresponding numerical apertures;
the fibers of one of said bundles having an appreciably larger numerical aperture than the fibers of the remaining bundle; and
the plane of a light-receiving face of one bundle and that of a light emitting face of the other bundle cutting corresponding fibers of said pair on a bias and said biasing faces being optically joined together to further expand said differential of numerical aperture of said oppositely disposed light-receiving and light-emitting faces of said device.

2. A fiber optic device having light-conducting and light-emitting oppositely disposed faces, one face having a different numerical aperture than the other, said device comprising:
a coupled together pair of bundles of tightly juxtapositioned light-conducting fibers, the fibers of said bundles individually comprising a core of high refractive index material and a cladding of material having a lower index of refraction than said core wherewith opposite end faces of said fibers are individually provided with a numerical aperture determined by the difference in refractive index between said core and cladding and said end faces in each of said bundles collectively providing the respective bundle faces with corresponding numerical apertures;
each of the fibers of one of said bundles being longitudinally tapered thereby providing the bundle with opposite end faces of different sizes;
the other bundle having opposite end faces of substantially equal size; and
the larger of said faces of said bundle of tapered fibers and one face of said other bundle of fibers being optically interfacially coupled together, at least one of said coupled faces being cut on a bias across its respective fibers to render the uncoupled oppositely disposed faces of said bundles of different numerical aperture.

3. A fiber optic device according to claim 2 wherein the larger of said faces of said bundle of tapered fibers is cut on a bias across its respective fibers at said interfacial coupling of said pair of bundles.

4. A fiber optic device according to claim 2 wherein one face of said bundle having opposite end faces of substantially equal sizes is cut on a bias across its respective fibers.

5. A fiber optic device according to claim 2 wherein both the large face of said bundle of tapered fibers and said one face of said other bundle are cut on a bias across their respective fibers.

* * * * *